United States Patent [19]
Cibura et al.

[11] Patent Number: 5,792,804
[45] Date of Patent: Aug. 11, 1998

[54] PROCESS FOR THE PREPARATION OF AN AQUEOUS COATING COMPOSITION, AQUEOUS COATING COMPOSITIONS, AND THE USE THEREOF FOR COATING PACKAGING CONTAINERS

[75] Inventors: Klaus Cibura; Hans Jürgen Figge; Regina Willmer, all of Münster; Holger Herbert Dartmann, Drensteinfurt, all of Germany

[73] Assignee: BASF Lacke + Farben, AG, Muenster-Hiltrup, Germany

[21] Appl. No.: 204,426

[22] PCT Filed: Sep. 16, 1992

[86] PCT No.: PCT/EP92/02123

§ 371 Date: Mar. 14, 1994

§ 102(e) Date: Mar. 14, 1994

[87] PCT Pub. No.: WO93/06146

PCT Pub. Date: Apr. 1, 1993

[30] Foreign Application Priority Data

Sep. 24, 1991 [DE] Germany .................. 41 31 706.8

[51] Int. Cl.⁶ .................. C08K 3/20; C08K 283/00
[52] U.S. Cl. .................. 523/406; 523/412; 525/438; 525/531; 525/529; 525/530
[58] Field of Search .................. 525/438, 531, 525/530, 529; 523/403, 406, 412

[56] References Cited

U.S. PATENT DOCUMENTS

| | | | |
|---|---|---|---|
| 4,076,676 | 2/1978 | Sommerfeld | 523/416 |
| 4,098,744 | 7/1978 | Allen et al. | 260/29.3 |
| 4,119,609 | 10/1978 | Allen et al. | 525/510 |
| 4,212,781 | 7/1980 | Evans et al. | 260/29.4 |
| 4,289,811 | 9/1981 | Shelley, Jr. | 525/514 |
| 4,304,701 | 12/1981 | Das et al. | 525/286 |
| 4,798,877 | 1/1989 | Hoffman et al. | 525/531 |
| 5,043,366 | 8/1991 | Isozaki | 525/286 |

FOREIGN PATENT DOCUMENTS 2-229820  9/1990  Japan.

Primary Examiner—Randy Gulakowski
Attorney, Agent, or Firm—Anne Gerry Sabourin

[57] ABSTRACT

The present invention relates to a process for the preparation of an aqueous coating composition containing a carboxyl-containing epoxy resin having an acid number in the range from 5 to 200 mg of KOH/g and having an epoxide equivalent weight in the range from 1000 to 40,000, optionally crosslinking agents, organic solvents, optionally conventional assistants and additives, and optionally pigments and fillers. The organic binder solution is neutralized using a tertiary amine in the temperature range from 60° C. to 120° C. This is followed by dispersion in water, with the proviso that at least 95% of the epoxide groups of the epoxy resin have been reacted. The aqueous coating compositions prepared by the process are preferably used for coating cans.

7 Claims, 1 Drawing Sheet

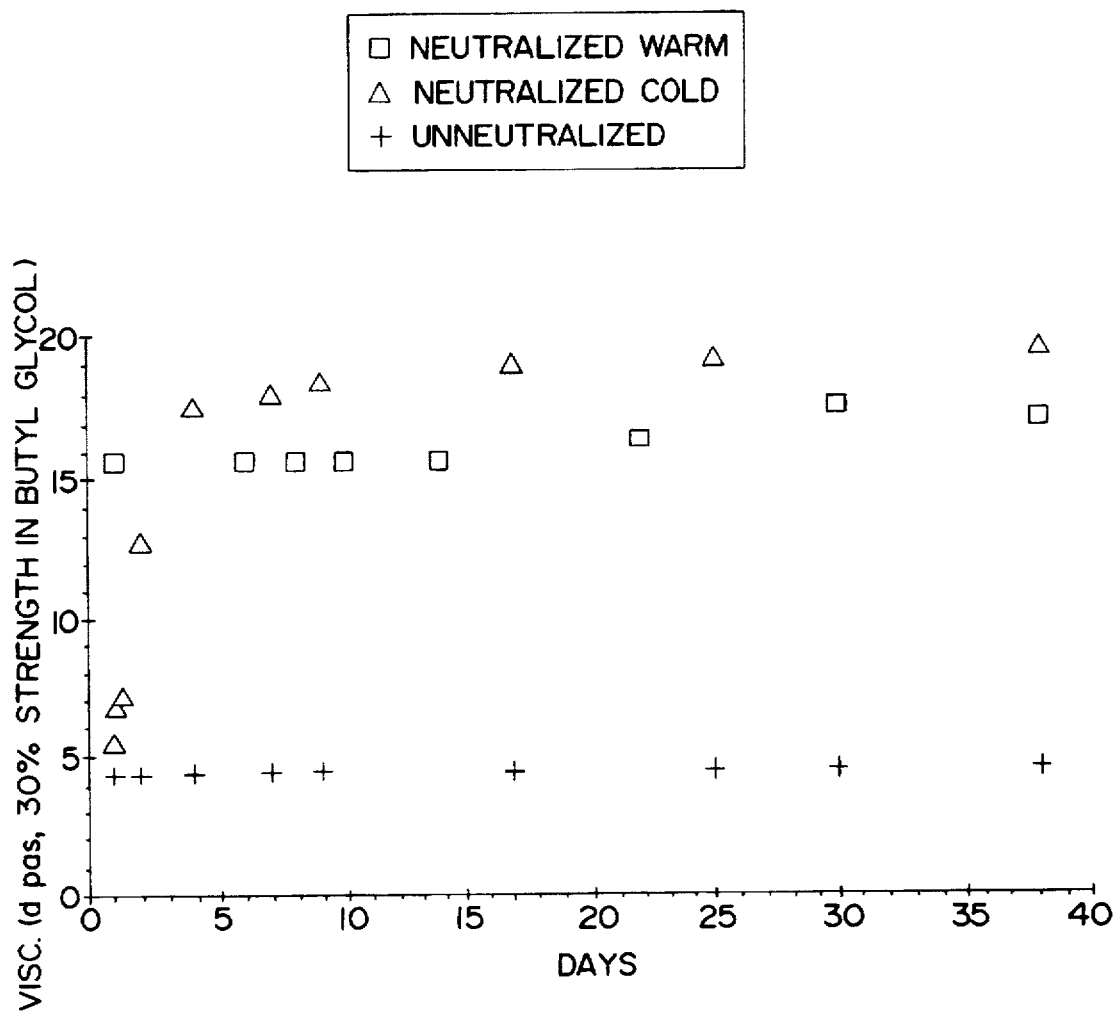
FIG I

PROCESS FOR THE PREPARATION OF AN AQUEOUS COATING COMPOSITION, AQUEOUS COATING COMPOSITIONS, AND THE USE THEREOF FOR COATING PACKAGING CONTAINERS

The present invention relates to a process for the preparation of an aqueous coating composition containing a carboxyl-containing epoxy resin, optionally crosslinking agents, organic solvents, optionally conventional assistants and additives, and optionally pigments and fillers, in which the organic binder solution is neutralized by means of a tertiary amine with supply of heat. The invention furthermore relates to the aqueous coating compositions prepared by the process, and to the use of the compositions for coating packaging containers, preferably for coating cans.

U.S. Pat. No. 4,212,781 discloses aqueous packaging-container coating agents whose binders are prepared by free-radical polymerization of ethylenically unsaturated monomers, some of which contain carboxyl groups, in the presence of an epoxy resin, using at least 3% by weight, based on the total weight of the monomers, of peroxidic initiators. According to the U.S. Patent, the organic solution of the resultant binder mixture is dispersed in water using neutralizers, for example tertiary amines. The organic binder solution here is preferably introduced into a mixture of water and dimethylethanolamine. However, it is also possible to add the amine with a little water with vigorous stirring to the organic solution; U.S. Pat. No. 4,212,781 makes the global statement that warming may optionally be effected during this operation. In the examples of U.S. Pat. No. 4,212,781, the neutralization is carried out by adding the organic binder solution, cooled to 85° C., dropwise to the amine/water mixture, during which the temperature of the resultant mixture increases to 50° C. The aqueous coating agents contain crosslinking agents, preferably amino plastic resins.

U.S. Pat. No. 4,076,676 discloses aqueous can coatings which contain products of the reaction of epoxy resins containing on average 2 terminal glycidyl groups, for example the epoxy resins obtainable under the trade name Epon 1004 and Epon 1007, with tertiary amines. The reaction products are adducts containing quaternary ammonium groups. The compositions disclosed in U.S. Pat. No. 4,076,676 contain amino resins as crosslinking agents. The epoxy resins used in U.S. Pat. No. 4,076,676 contain no acid groups; the water-dispersibility is caused exclusively by the quaternary ammonium groups. The reaction between the epoxy resins and the tertiary amine is preferably carried out in the temperature range from 70° to 80° C.

U.S. Pat. No. 4,247,439 and U.S. Pat. No. 4,302,373 disclose aqueous packaging-container coating compositions based on carboxyl-containing polymers, polyepoxides and tertiary amines. The compositions may be self-crosslinking. The compositions are preferably prepared by dissolving the epoxy resin in the COOH prepolymer and organic solvents, and adding the tertiary amine in water to the mixture, preferably at temperatures between 50° C. and 100° C. The coating agents contain polymeric quaternary ammonium amine salts of polymeric acids. The use of the COOH group-containing prepolymers is regarded as disadvantageous in the aqueous coating agents since they must be prepared in a separate reaction step. In any case, a single-step process is preferred for the preparation of the binder mixtures.

Finally, WO 89/1498 relates to aqueous dispersions which are suitable as coating agents for metal containers for storing foodstuffs and beverages. The coating compositions contain binder mixtures prepared by addition polymerization of relatively inexpensive monomers, such as, for example, styrene, in a reaction medium containing modified epoxy resins. These are obtained by reaction of some of the epoxide groups with ethylenically unsaturated monomers containing groups which are reactive with epoxide groups, such as, for example, unsaturated carboxylic acids, and reaction of further epoxide groups with tertiary amines and with a preaddition polymer which contains carboxyl groups and contributes to the water-dispersibility. The compositions of WO 89/1498 may be self-crosslinking, depending on the application, but have the disadvantage that the binder mixtures must be prepared in more than one step, ie. carboxyl-containing prepolymers are used.

The object of the present invention was to provide a process for the preparation of aqueous coating agents based on carboxyl-containing epoxy resins in which COOH prepolymers prepared in advance are not used. The coating agents obtained by the preparation process should thus contain binders which can be prepared as simply as possible, ie. which can be prepared if possible in one step and should also, in some cases, be self-crosslinking. The aqueous dispersions or solutions prepared by the process and based on COOH-modified epoxy resins should be stable, ie. should have an extended shelf life, which is taken to mean that the viscosities of the aqueous dispersions or solutions should not change significantly over an extended period. The process for the preparation of the aqueous coating agents should be distinguished by the lowest possible amine requirement for the preparation of stable dispersions, since a reduced amine requirement is desirable for toxicological and ecological reasons and a low amine requirement is associated with a greater latitude in the degree of neutralization for the preparation of a stable dispersion and allows the viscosity of the dispersion or solution to be varied within a relatively large range, depending on the application or method of applying the coating.

The object of the present invention is achieved by the process of the type mentioned at the outset, which is characterized in that the organic binder solution, containing a carboxyl-containing epoxy resin having an acid number in the range from 5 to 200 mg of KOH/g, preferably from 35 to 150 mg of KOH/g, and having an epoxide equivalent weight in the range from 1000 to 40,000, is neutralized in the temperature range from 60° C. to 120° C. using a tertiary amine, optionally dissolved in a little water, and the dispersion in water is carried out subsequently, with the proviso that at least 95% of the epoxide groups of the epoxy resin have been reacted.

The amine used for the neutralization can thus be added in pure form or dissolved in some of the water to the binder solution heated to from 60° C. to 120° C. Particular preference is given here to a temperature range from 70° C. to 110° C. The amine is preferably added with vigorous stirring. The tertiary amine or the amine/water mixture should be added over the course of from about 10 to 30 minutes. It is preferred to keep the reaction mixture in the temperature range from 60° C. to 120° C. for at least 15 minutes after addition of the amine. The binder solution neutralized in this way is subsequently dispersed into the remainder of the water over a period of about 30 minutes. Alternatively, the remainder of the water can be dispersed into the neutralized binder solution. It is advisable here to prewarm the water to from 40° C. to 80° C. and to carry out the dispersion operation in this temperature range. Dispersion is expediently continued subsequently. The degree of neutralization is of course dependent on the hydrophilicity of the binder system used.

Suitable tertiary amines are N-methylmorpholine, N-methylpyrrolidine, pyridine, N-methylpyrrole, trimethylamine, triethylamine, dimethylethanolamine, diethylmethylamine, methyldiethanolamine, ethylmethylethanolamine, dimethylethylamine, dimethylpropylamine, dimethyl-3-hydroxy-1-propylamine, dimethylbenzylamine, dimethyl-2-hydroxy-1-propylamine, dimethyl-1-hydroxy-2-propylamine and mixtures. Particular preference is given to dimethylethanolamine.

Examples of suitable organic solvents are monoalcohols having 3 to 18 carbon atoms, such as, for example, butanol, isobutanol, propanol, isopropanol, 2-ethylhexyl alcohol and cyclohexanol, glycol ethers, such as, for example, butyl glycol, butyl diglycol and hexyl glycol, and glycols, such as ethylene glycol, diethylene glycol, 1,3-butylene glycol and propylene glycol.

Carboxyl-containing epoxy resins which are preferably used in the process according to the invention are those prepared by free-radical copolymerization of ethylenically unsaturated monomers, some of which contain carboxyl groups, such as, for example, acrylic acid, methacrylic acid, crotonic acid and itaconic acid, in the temperature range from 60° C. to 200° C., preferably from 120° C. to 140° C., using at least 2% by weight, based on the total weight of the monomers, of peroxidic initiators in the presence of an epoxy resin containing on average more than one epoxide group per molecule. Resins of this type are described, for example, in U.S. Pat. No. 4,212,781. Preferred starting epoxy resins are polyglycidyl ethers of bisphenol A. The preferred ethylenically unsaturated monomer is a mixture of styrene, methacrylic acid, ethyl acrylate and optionally also methyl methacrylate. A further suitable monomer mixture consists of 2-ethylhexyl acrylate, methyl methacrylate and acrylic acid. The acid group-containing monomers are employed here in a proportion which is necessary to reach the desired acid number of the modified epoxy resin. Examples of suitable free-radical initiators are cumene hydroperoxide, dibenzoyl peroxide, t-butyl perbenzoate, di-t-butyl peroxide, lauroyl peroxide, t-butyl peroxy 2-ethylhexanoate, t-butyl peroxyisononanoate and methyl ethyl ketone peroxide. However, not only the binders described in U.S. Pat. No. 4,212,781 as carbon graft copolymers, but also binders based on COOH-modified epoxy resins, obtained by ester grafting, are suitable in the process according to the invention. The latter are formed, in particular, if the polymerization is carried out at low initiator concentrations.

Preferred carboxyl-containing epoxy resins having an acid number in the range from 5 to 200 mg of KOH/g and an epoxide equivalent weight in the range from 1000 to 40,000 are the binders described in DE-A-40 01 251. These are prepared by I. reacting
A) from 20 to 80% by weight of an epoxy resin containing on average more than one epoxide group per molecule and having a number average molecular weight of at least 850 with
B) from 1 to 60% by weight of a carboxyl-containing polyester resin having a number average molecular weight of from 500 to 5000 and an acid number of from 2 to <30 mg of KOH/g
at temperatures of from 80° C. to 200° C., preferably at from 120° C. to 180° C., using catalysts, in such a way that from 50 to <80% of the oxirane rings initially present have been opened, and
II. polymerizing
C) from 10 to 50% by weight of ethylenically unsaturated monomers, from 10 to 50% by weight of the monomers containing carboxyl groups, in the presence of the reaction product obtained in the first process step, at temperatures of from 60° C. to 200° C., preferably from 120° C. to 140° C., using at least 2% by weight, based on the weight of the ethylenically unsaturated monomers C, of peroxidic initiators, where the sum of the proportions by weight of components A to C is in each case 100% by weight.

Component A is preferably an epoxy resin based on bisphenol A and having a number average molecular weight of from 850 to 20,000. Examples of suitable epoxy resins are glycidyl polyethers, which are marketed, for example, under the trade names Epikote 1001, 1004, 1007, 1008, 1055 and 1009. The epoxy resins advantageously have a number average molecular weight of from 1200 to 3000.

Component B is a polyester having a number average molecular weight of from 500 to 5000, preferably from 1000 to 3000, and an acid number of from 2 to <30 mg of KOH/g, preferably from 10 to 20 mg of KOH/g.

The polyesters employed as component B are prepared by |sic| the conditions known to a person skilled in the art for polyesterification reactions. These are known polycondensates made from aromatic and/or aliphatic dicarboxylic acids, aromatic dicarboxylic anhydrides, aromatic tricarboxylic anhydrides, aromatic tetracarboxylic anhydrides and dianhydrides and aliphatic and cycloaliphatic monools, diols and triols. Preferred starting compounds for the polyesters (component B) are terephthalic acid, isophthalic acid, dimethyl terephthalate, o-phthalic acid, o-phthalic anhydride, trimellitic acid, trimellitic anhydride, adipic acid, sebacic acid, aliphatic monools having 4 to 20 carbon atoms, 2,2-dimethyl-1,3-propanediol, ethylene glycol, diethylene glycol, 1,6-hexanediol, trimethylolpropane, glycerol and pentaerythritol.

The ethylenically unsaturated monomers employed as component C comprise from 10 to 50% by weight of carboxyl-containing monomers. Examples which may be mentioned of carboxyl-containing monomers are acrylic acid and methacrylic acid. The monomers employed may furthermore be non-functionalized monomers, such as, for example, styrene, vinyltoluene and α-methylstyrene, preferably styrene.

As a third class of monomers, (meth)acrylates having 1 to 20 carbon atoms in the alcohol radical, it also being possible to employ hydroxyl-functional monomers, are preferably used.

Examples of these are ethyl acrylate, propyl acrylate, isopropyl acrylate, butyl acrylate, isobutyl acrylate, t-butyl acrylate, pentyl acrylate, decyl acrylate, lauryl acrylate, methyl methacrylate, butyl methacrylate, isobutyl methacrylate, hexyl methacrylate, 2-ethylhexyl methacrylate, octyl methacrylate, nonyl methacrylate and hydroxyethyl acrylate, hydroxypropyl acrylate, hydroybutyl [sic] acrylate, hydroxyethyl methacrylate, hydroxypropyl methacrylate and hydroxybutyl methacrylate.

The ethylenically unsaturated monomers of component C preferably comprise
x) from 10 to 50% by weight, preferably from 20 to 40% by weight, of carboxyl-containing monomers,
y) from 0 to 50% by weight, preferably from 20 to 40% by weight, of non-functionalized monomers and
z) from 5 to 60% by weight, preferably from 10 to 50% by weight, of (meth)acrylates which have 1 to 20 carbon atoms in the alcohol radical and are optionally hydroxyl-functional, where the sum of x, y and z is 100% by weight.

Component C has an acid number in the range from 30 to 150, preferably in the range from 50 to 100, mg of KOH/g.

The carboxyl-containing epoxy resin is preferably obtained from 20 to 60% by weight of A, from 10 to 40% by weight of B and from 15 to 40% by weight of C, where the sum of the proportions by weight of components A, B and C is 100% by weight.

In order to initiate the polymerization of components x, y and z, at least 2% by weight, preferably at least 2.6% by weight and particularly preferably at least 3% by weight, based on the total weight of the ethylenically unsaturated monomers, of dibenzoyl peroxide or a free-radical-initiating equivalent are employed at the use temperature. Preference is given to initiators which form benzoyloxy and/or phenyl free radicals.

Examples of suitable initiators are dibenzoyl peroxide, t-butylbenzoyl peroxide, tert.-butyl peroctanoate, cumene hydroperoxide and methyl ethyl ketone peroxide, di-tert.-butyl peroxide, tert.-butyl peroxy-2-ethylhexanoate, tert.-butyl peroxyisononanoate, tert.-butyl peroxyisobutyrate and tert.-amyl peroxy-2-ethylhexanoate.

To prepare the carboxyl-containing epoxy resins described in DE-A-40 01 251, first the epoxy resin A is reacted with the polyester component B at from 80° to 200° C., preferably at from 120° to 180° C., using catalysts, so that at least 50%, preferably from 50 to <80%, of the oxirane rings initially present are opened. Component C is subsequently subjected to free-radical polymerization in the presence of the reaction product obtained in the first process step, at from 60° to 200° C., preferably at from 120° to 140° C., using at least 2% by weight, based on the weight of the ethylenically unsaturated monomers, of peroxidic initiators, preferably initiators which form benzoyloxy and/or phenyl free radicals.

The reaction of the epoxy resin with the polyester resins which takes place in the first process step is catalyzed by amines, preferably by tertiary amines. The reaction is carried out by converting at least 50%, preferably from 50 to <80%, of the oxirane rings into β-hydroxyester or β-hydroxyether groups.

In the second process step, the ethylenically unsaturated monomers, some of which contain carboxyl groups, of component C are subjected to a free-radical polymerization reaction in the presence of the epoxypolyester adduct formed in the first process step. The free-radical polymerization is initiated by at least 2% by weight, based on the total weight of the monomers, of peroxidic initiators, preferably initiators which form benzoyloxy and/or phenyl free radicals. Preferably at least 2.6% by weight, particularly preferably at least 3% by weight, of initiators are used here. Good results are of course also achieved if high proportions of initiators, for example from 8 to 10% by weight, are employed, but this is inadvisable for economic reasons. If the polymerization is carried out in the presence of relatively low initiator concentrations, for example at less than 3% by weight, based on the monomer weight, a higher degree of neutralization is necessary to obtain a stable dispersion.

The proportion of residual monomers is advantageously kept at less than 0.4%, based on the total weight of the binder solution comprising the COOH-modified epoxy resin, crosslinking agents, neutralizers and organic solvents, by additional metering in of initiator and/or by extending the initiator feed.

It is also preferred according to the present invention to use carboxyl-containing epoxy resins prepared by optionally chain-extending an epoxy resin containing on average more than one epoxide group per molecule by means of a diphenol and subsequently reacting this with a carboxylic anhydride until the desired acid number, which is in the range from 5 to 200 mg of KOH/g, has been reached. Epoxy resins of this type are described, for example, in German Patent 27 47 818. The epoxy resins employed are diglycidyl ethers of bisphenols, preference being given to diglycidyl ethers of bisphenol A. The epoxy resins may optionally be chain-extended by means of diphenols, for example by means of bisphenol A or bisphenol F, but it should be ensured that the modified epoxy resin still contains sufficient epoxide groups. In this reaction, the reaction mixture is usually heated to about 120° C. The reaction is exothermic, so that the temperature of the reaction mixture increases to from about 160° C. to 200° C. When the adduct formation is complete, a solvent which has a boiling point above 100° C. and up to about 125° C. and is inert toward the carboxylic anhydride subsequently employed is added to the reaction mixture. Suitable solvents are ketones, ethers and esters. Examples are methyl n-propyl ketone, methyl isobutyl ketone, diisobutyl ether, n-propyl acetate, n-butyl acetate, isobutyl acetate, n-propyl propionate and ethyl butyrate. Ketones are particularly preferred.

Anhydrous conditions are necessary before the anhydride is added. Residual amounts of water should be purged if necessary. When all water has been removed, the anhydride is added in such an amount that an acid number of between 5 and 200, preferably between 35 and 150, mg of KOH/g is reached. The reaction is usually carried out at a temperature between about 100° and 120° C. for from about 2 to 4 hours. The reaction with the anhydride is complete when the alcoholic acid number and the aqueous acid number are essentially identical, usually with a difference of less than two units. In order to ensure a good shelf life, the anhydride number must be below 2 and is preferably 0. The anhydride number is the difference between the alcoholic acid number and the aqueous acid number.

An alkoxy ethanol which boils at about 130° C. or higher is added, and the azeotropic solvent is removed in vacuo. At least ⅔ of this solvent must be removed, and all the solvent should preferably be removed. Other solvents, such as alcohols, can then be added in order to reduce the solids content to from about 50 to 75% by weight.

Suitable cyclic carboxylic anhydrides are trimellitic anhydride, succinic anhydride, methylsuccinic anhydride, tricarballyl anhydride, phthalic anhydride, hexahydrophthalic anhydride and maleic anhydride. Preference is given to trimellitic anhydride.

The amount of anhydride used must be sufficient to achieve an acid number in the range from 5 to 200 mg of KOH/g. In order to ensure a good shelf life of the coating compositions prepared from the COOH-modified epoxy resin, unreacted anhydride groups should no longer be present.

For further details with respect to these epoxy resins prepared in this way, reference is made to further details in German Patent 27 47 818. However, it should be ensured in the present process according to the invention that the epoxide equivalent weight of the COOH-modified epoxy resins is in the range from 1000 to 40,000, whereas preferably all the epoxide groups of the starting epoxy resin are reacted in German Patent 27 47 818 by adduct formation with diphenols.

In the process according to the invention, it is also possible to use COOH-modified epoxy resins described in WO 88/1287, so long as these have the requisite acid number and the requisite epoxide equivalent weight.

Acid group-containing, urethane-modified epoxy resins, obtainable, for example, by reacting the product of the reaction of hydroxycarboxylic acids and polyisocyanates with the secondary hydroxyl groups of an epoxy resin, are furthermore suitable in the process according to the invention.

In addition to the epoxy resins described, other COOH-modified epoxy resins are used in the process according to the invention.

Crosslinking agents may optionally be used in the process according to the invention. The cross-linking agent may be any desired phenolic resin, so long as it has the methylol functionality necessary for the reactivity. Preferred phenolic resins are products, prepared under alkaline conditions, of the reaction of phenol, substituted phenols and bisphenol A with formaldehyde. Under such conditions, the methylol group is linked to the aromatic ring either in the ortho-position or in the para-position.

Preference is given to phenolic resins of the resol type which are based on bisphenol A and contain more than one methylol group per phenyl ring.

Other suitable crosslinking agents are amino resins. Typical amino resins are melamine-, benzoguanamine- and urea-formaldehyde resins. These are preferably used in lower alcohol-, usually methanol and/or butanol-etherified form. Examples of suitable amino resins are commercially available under the trade names Cymel, Luwipal, Maprenal and Beetle. An example of a suitable amino resin is hexamethoxymethylmelamine.

In addition to condensation products with formaldehyde, it is of course also possible to use those with other aldehydes.

Other suitable crosslinking agents are isocyanate crosslinking agents, which can be employed alone or together with the phenolic and/or amino resin. Examples of isocyanate crosslinking agents of this type are blocked isocyanates, preferably of the hexamethylene diisocyanate or tolylene diisocyanate type, which are commercially available, for example, under the trade name Desmodur.

However, crosslinking agents need not necessarily be employed, since the aqueous coating compositions prepared by the preparation process according to the invention can also be cured to give a resistant, highly adherent coating even without crosslinking agents if they have an adequate number of quaternary ammonium structures.

The aqueous coating compositions prepared by the preparation process of the present invention optionally contain conventional assistants and additives and optionally pigments and fillers.

Pigments and/or fillers are preferably employed in amounts of from 25 to 35% by weight, based on the total weight of the coating material. Examples of suitable pigments are titanium dioxide, for example the products obtainable under the trade names Titan Rutil RN 59, RTC 60, R 900 and RDI-S.

Suitable fillers are barium sulfate, such as, for example, the commercial products Blancfix micro, Blancfix F; silicon dioxide, for example the commercial product Quarzmehl SF 600; potassium carbonate and talc.

Examples of conventional assistants and additives are lubricants, plasticizers, stabilizers, wetting agents, dispersion assistants, catalysts and surface-active additives.

The cosolvents necessary for the production of a film with good flow-out can be added to the system before or after the neutralization by means of a tertiary amine.

After the neutralization, further conventional assistants, additives, pigments, fillers and cross-linking agents are optionally admixed with the system in the process according to the invention, and the coating composition is dispersed in water.

The present invention also relates to the aqueous coating compositions prepared by the process according to the invention.

The aqueous coating compositions obtained by the preparation process according to the invention cure during a time of from 2 seconds to 10 minutes in the object temperature range from 150° to 400° C. They can be applied by rolling, knife coating, brushing, spraying, flooding or dipping by means of conventional equipment, the film subsequently being cured to give a highly adherent coating. In the case of external coatings for cans, the coating materials are preferably applied by roller; in the case of internal coatings for cans, they are preferably applied by spraying. The aqueous coating materials can also be applied by electrophoretic electrodeposition coating. Here, the parts to be coated are dipped into an aqueous bath based on the abovedescribed coating agents according to the invention and connected as an electrode. A film is deposited on the cans by means of a direct current, the substrate is removed from the bath, and the film is cured by baking.

The coating materials are preferably applied as a one-coat finish, generally in a dry film thickness of from 5 to 25 μm.

The coating materials prepared by the process according to the invention are suitable for coating packaging containers, in particular for the external coating of cans and the like. However, they can also be employed for the internal coating of the cans and the like. The packaging containers can comprise a very wide variety of materials and have a very wide variety of geometries. Suitable materials are, in particular, aluminum, tin-free steel, tinplate and various iron alloys, which are optionally provided with a passivation coating based on compounds of nickel, chromium and zinc. The packaging containers may be coated in the form, for example, of can halves, ie. bodies and lids, as 3-part cans and as 2-part, drawn-and-ironed or otherwise deep-drawn cans, such as, for example, beverage and preserve cans.

The advantages of the process according to the invention are that the aqueous coating compositions prepared are extremely stable. After the coating compositions have been stored for several weeks, no significant variations in viscosity are observable. In this way, the process is distinguished compared with the processes known hitherto for the preparation of aqueous coating compositions based on carboxyl-containing epoxy resins. This stabilization of the aqueous dispersions or solutions prepared by the process according to the invention is presumably attributable to the formation of quaternary ammonium structures by reaction of the tertiary amine with the oxirane groups of the COOH-modified epoxy resin in the temperature range from 60° C. to 120° C. The zwitterion structures formed are stable in a certain temperature range and stabilize the aqueous dispersions or solutions both by anionic and by cationic structures. It is assumed that the tertiary amine is re-eliminated at elevated temperature, more precisely under baking conditions, and the oxirane rings are re-formed. The epoxide groups, which are labile in aqueous medium, are therefore protected in the process according to the invention by conversion into quaternary ammonium structures, so that they are ready for crosslinking reactions after application. In addition, it is very advantageous that the epoxide groups are protected during storage of the aqueous coating compositions and thus cannot result in undesired variations in viscosity of the aqueous coating compositions.

It may be regarded as a further advantage that the dispersions or solutions prepared in the process according to the invention can be formulated to be self-crosslinking, since the protected epoxide groups are re-liberated during the curing process and are available for crosslinking reactions.

Further advantages of the process according to the invention are that the amount of amine necessary for the preparation of stable dispersions or solutions is significantly lower than in known preparation processes. This is presumably attributable to the ionic stabilization by the quaternary ammonium structures. Reduced amounts of amine for the preparation of stable dispersions are on the one hand desirable for toxicological and ecological reasons. On the other hand, the proportion of amine determines the viscosity of the aqueous compositions and thus ultimately also the applicational properties of the coating compositions. As is known, larger proportions of amine result in higher viscosities than do low amounts of amine, and larger amounts of water are therefore required for viscosity control in the case of larger amounts of amine. As a consequence of the relatively large latitude in the degree of neutralization for the preparation of stable dispersions or solutions, the pH and thus also the viscosity of the aqueous dispersions or solutions can be varied within relatively broad limits in the present process compared with the preparation processes known from the prior art. This is particularly advantageous since, depending on the method of application of the aqueous coating compositions, different viscosities of the coating materials are necessary. Coating compositions which are to be applied by roller must, for example, have higher viscosities than coating materials to be applied by spraying.

A further advantage of the coating compositions prepared by the process according to the invention is that the coatings obtained adhere particularly well to steel substrates.

The invention is described in greater detail below with reference to working examples:

EXAMPLE 1

1.1 Preparation of a polyester precursor 674 g of terephthalic acid, 112 g of trimellitic anhydride, 847 g of adipic acid, 19 g of pentaerythritol, 1215 g of diethylene glycol and 8 g of esterification catalyst are weighed out into a four-necked flask fitted with stirrer, thermometer and water separator, and the mixture is condensed at 230° C. to an acid number of 15 mg of KOH/g. The polyester melt is finally dissolved to the extent of 75% in butyl glycol. The partial solution has a viscosity of 3840 mPas (plate-and-cone viscometer, 23° C.).

1.2 Preparation of an epoxy ester resin

A mixture of 772 g of an epoxy resin based on bisphenol A and having an epoxide equivalent weight of 940, 254 g of butyl glycol, 2 g of N,N-dimethylbenzylamine and 1023 g of the polyester resin prepared in 1.1 is warmed to 160° C. in a four-necked flask fitted with stirrer, thermometer and reflux condenser until the acid number has dropped to below 2 mg of KOH/g. The epoxy ester prepared in this way has a viscosity of 50 mPas in 30% strength solution in butyl glycol (plate-and-cone viscometer, 23° C.).

1.3 Preparation of a copolymer

2051 [lacuna] of the epoxy ester prepared in 1.2 are introduced into a four-necked flask fitted with thermometer, reflux condenser and two feed flasks. At 120° C., a mixture of 163 g of acrylic acid, 166 g of styrene and 327 g of butyl acrylate is added from the first feed container and simultaneously a solution of 25 g of dibenzoyl peroxide (75% strength) in 122 g of methyl ethyl ketone is added from the second feed container. The monomers are metered in over a period of 2 hours and the initiator over a period of 2.5 hours. When the polymerization is complete, the solids content is adjusted to 60% by means of butyl glycol. The binder has an acid number of 57 mg of KOH/g (based on the solids) and a viscosity of 120 mPas in 30% strength solution in butyl glycol (plate-and-cone viscometer, 23° C.).

1.4 Neutralization of the copolymer from 1.3 by the claimed process (degree of neutralization 35%)

1000 g of the copolymer prepared in 1.3 are weighed out into a four-necked flask fitted with stirrer, thermometer, reflux condenser and a feed container, and heated to 110° C. 19 g of dimethylethanolamine are introduced into the feed container and metered into the copolymer solution over a period of 10 minutes. The mixture is kept at 110° C. for a further 20 minutes and subsequently cooled.

1.5 Preparation of an external white coating A for beverage cans by means of the binder solution neutralized in 1.4

To prepare an external white coating A for beverage cans, 24.30 parts of the binder solution neutralized in 1.4 are triturated with 2.50 parts of Blanc Fix Micro, 23.60 parts of titanium dioxide of the rutile type and 0.05 part of poly (tetrafluoroethylene) wax (for example Lanco TF 1780) for about 10 minutes, so that a fineness of less than 10 μm results. A further 4.30 parts of a commercially available benzoguanamine resin (for example Luwipal B017, Cymel 1123), 3.00 parts of an epoxy ester (for example Resydrol 5171), 0.90 part of a blocked isocyanate (for example Desmodur 2759), 1.90 parts of a polyethylene wax (for example Luba Print VP 714) and 11.75 parts of butyl glycol are added to the triturated mixture. The mixture is subsequently dispersed in 21.80 parts of fully demineralized water. The coating has a flow-out time of 210 seconds, a pH of 6.7 and has a shelf life of more than 3 months.

1.6 Comparative example: Preparation of an external white coating B for beverage cans (degree of neutralization 35%)

To prepare an external white coating B for beverage cans, 24.30 parts of the binder solution prepared under 1.3 are triturated with 2.50 parts of Blanc Fix Micro, 23.60 parts of titanium dioxide of the rutile type and 0.05 part of poly (tetrafluoroethylene) wax (for example Lanco TF 1780) for about 10 minutes, so that a fineness of less than 10 μm results. A further 4.30 parts of a commercially available benzoguanamine resin (for example Luwipal B017, Cymel 1123), 3.00 parts of an epoxy ester (for example Resydrol 5171), 0.90 part of a blocked isocyanate (for example Desmodur 2759), 1.90 parts of a polyethylene wax (for example Luba Print VP 714) and 11.75 parts of butyl glycol are added to the triturated mixture, which is neutralized by means of 0.46 part of dimethylethanolamine (corresponds to a degree of neutralization of 35%). The mixture is subsequently dispersed in 21.80 parts of fully demineralized water. The coating separates out within a short time.

1.7 Comparative example: Preparation of an external white coating C for beverage cans (degree of neutralization 56%)

To prepare an external white coating C for beverage cans, 24.30 parts of the binder solution prepared in 1.3 are triturated with 2.50 parts of Blanx [sic] Fix Micro, 23.60 parts of titanium dioxide of the rutile type and 0.05 part of PTFE wax (for example Lanco TF 1780) for about 10 minutes, so that a fineness of less than 10 μm results. A further 4.30 parts of a commercially available benzoguanamine resin (for example Luwipal B017, Cymel 1123), 3.00 parts of an epoxy ester (for example Resydrol 5171), 0.90 part of a blocked isocyanate (for example Desmodur 2759), 1.90 parts of a PE wax (for example Luba Print VP 714) and 11.75 parts of butyl glycol are added to the triturated mixture, which is neutralized by means of 0.74 part of dimethylethanolamine (corresponds to a degree of neutralization of 56%). The mixture is subsequently dispersed in 21.80 parts of fully demineralized water. The coating has a flow-out time of 256 seconds, a pH of 7.1 and has a shelf life of more than 3 months.

EXAMPLE 2

2.1 Preparation of an epoxy acrylate 1187 g of an epoxy resin based on bisphenol A and having an epoxide equivalent weight of 1720 are introduced into 515 g of butyl glycol and 486 g of n-butanol in a four-necked flask fitted with stirrer, thermometer, reflux condenser and two feed flasks. At 120° C., a mixture of 217 g of methacrylic acid, 137 g of styrene and 150 g of ethyl acrylate is added from the first feed container and simultaneously a solution of 19 g of dibenzoyl peroxide (75% strength) in 97 g of methyl ethyl ketone is added from the second feed container. The monomers are metered in over a period of 2 hours and the initiator over a period of 2.5 hours. When the polymerization is complete, the solids content is adjusted to 60% by means of n-butanol. The binder has an acid number of 83 mg of KOH/g [lacuna] a viscosity of 280 mPas in 30% strength solution in butyl glycol (plate-and-cone viscometer, 23° C.).

2.2 Neutralization of the epoxy acrylate prepared in 2.1 by the claimed process (degree of neutralization 30%)

1000 g of the epoxy acrylate 2.1 are weighed out into a four-necked flask fitted with stirrer, thermometer, reflux condenser and a feed container, and heated to 110° C. 23.3 g of dimethylethanolamine are introduced into the feed container and metered in over a period of 15 minutes. The reaction mixture is then kept at 110° C. for a further 30 minutes.

2.3 Preparation of a water-thinnable internal spray coating D for beverage cans by means of the neutralized binder from 2.2 (degree of neutralization 30%)

1023.3 g of the neutralized binder from 2.2 are dispersed in 1484 g of fully demineralized water over a period of 30 minutes. The mixture is subsequently dispersed for a further 1 hour. The resultant dispersion has a solids content of 24% (15 minutes, 200° C.) and has a flow-out time of 12 seconds (DIN 4, 20° C.). The pH is 6.7. The dispersion has a shelf life of more than 3 months. The flow-out time of the dispersion remains constant over this period.

2.4 Comparative example: Preparation of a water-thinnable internal spray coating E for beverage cans (degree of neutralization 30%)

23.3 g of dimethylethanolamine and 1484 g of fully demineralized water are mixed in a dissolver. 1000 g of the binder prepared in 2.1 are dispersed in this aqueous amine solution over a period of 30 minutes. The resultant dispersion has a solids content of 24% (15 minutes; 200° C.) and has a flow-out time of 13 seconds (DIN 4, 20° C.). The pH is 6.8. The dispersion is not stable and separates out after a short time.

2.5 Neutralization of the epoxy acrylate prepared in 2.1 by the claimed process (degree of neutralization 42%)

1000 g of the epoxy acrylate prepared in 2.1 are weighed out into a four-necked flask fitted with stirrer, thermometer, reflux condenser and a feed container, and heated to 110° C. 32.6 g of dimethylethanolamine are introduced into the feed container and metered in over a period of 15 minutes. The reaction mixture is then kept at 110° C. for a further 30 minutes.

2.6 Preparation of a water-thinnable internal spray coating F for beverage cans (degree of neutralization 42%)

1032.6 g of the binder neutralized in 2.2 are dispersed in 1449 g of fully demineralized water over a period of 30 minutes. The mixture is subsequently dispersed for a further 1 hour. The resultant dispersion has a solids content of 24% (15 minutes, 200° C.) and has a flow-out time of 22 seconds (DIN 4, 20° C.). The pH is 7.0. The dispersion has a shelf life of more than 3 months. The flow-out time of the dispersion remains constant over this period.

2.7 Comparative example: Preparation of a water-thinnable internal spray coating G for beverage cans (degree of neutralization 42%)

32.6 g of dimethylethanolamine and 1474 g of fully demineralized water are mixed in a dissolver. 1000 g of the unneutralized binder prepared in 2.1 are dispersed in this aqueous amine solution over a period of 30 minutes. The resultant dispersion has a solids content of 24% (15 in |sic|, 200° C.) and has a flow-out time of 17 seconds (DIN 4, 20° C.). The pH is 6.9. The dispersion is not stable and separates out overnight.

2.8 Comparative example: Preparation of a water-thinnable internal spray coating H for beverage cans (degree of neutralization 75%)

57.6 g of dimethylethanolamine and 1449 g of fully demineralized water are mixed in a dissolver. 1000 g of the unneutralized binder prepared in 2.1 are dispersed in this aqueous amine solution over a period of 30 minutes. The resultant dispersion has a solids content of 24% (15 minutes, 200° C.) and has a flow-out time of 43 seconds (DIN 4, 20° C.). The pH is 7.2. The dispersion has a shelf life of more than 3 months, but the flow-out time changes over this period.

EXAMPLE 3

3.1 Preparation of an epoxy resin having an epoxide equivalent weight of 1740 from liquid epoxy resin and bisphenol A 1093 g of a liquid epoxy resin based on bisphenol A and having an epxoxy [sic] equivalent weight of 187, 556 g of bisphenol A, 0.5 g of ethyltriphenylphosphonium iodide and 183 g of butyl glycol are introduced into a four-necked flask fitted with stirrer, thermometer and reflux condenser. The mixture is warmed so that the reaction temperature rises to a maximum of 165° C., and the reaction is continued until an epoxide equivalent weight of 1740 is reached. The mixture is subsequently partially dissolved by means of 430 g of butyl glycol and 442 g of hexyl glycol.

3.2 Preparation of an epoxy acrylate 2678 g of the epoxy resin solution prepared in 3.1 are introduced into a four-necked flask fitted with stirrer, thermometer, reflux condenser and two feed flasks. At 140° C., a mixture of 298 g of methacrylic acid, 188 g of styrene and 206 g of ethyl acrylate is added from the first feed container and simultaneously a solution of 16 g of tert.-butyl perbenzoate in a mixture of 53 g of butyl glycol and 38 g of hexyl glycol is added from the second feed container. The monomers are metered in over a period of 2 hours, the initiator over a period of 2.5 hours. When the polymerization is complete, the solids content is adjusted to 60% by means of 226 g of butyl glycol and 163 g of hexyl glycol. The binder has an acid number of 70 mg of KOH/g and a viscosity of 440 mPas in 30% strength solution in butyl glycol (plate-and-cone viscometer, 23° C.).

3.3 Neutralization of the epoxy acrylate prepared in 3.2 by the claimed process (degree of neutralization 42%)

1000 g of the epoxy acrylate prepared in 3.2 are weighed out into a four-necked flask fitted with stirrer, thermometer, reflux condenser and a feed container, and heated to 90° C. A solution of 33.4 g of dimethylethanolamine in 111 g of fully demineralized water is introduced into the feed container and metered in over a period of 15 minutes. The reaction mixture is then kept at 90° C. for a further 30 minutes and subsequently cooled.

3.4 Comparative example: Neutralization of the epoxy acrylate prepared under 3.2 without supply of heat (degree of neutralization 42%)

33.4 g of dimethylethanolamine are added slowly with stirring at room temperature to 1000 g of the epoxy acrylate from 3.2. The mixture is stirred until a uniform solution has formed.

The cold-neutralized binder from 3.4 diaplays a significant increase in viscosity within the first 8 days, while the binder from 3.3 neutralized warm by the process according to the invention remains at the same viscosity level after neutralization. The slight increase in viscosity for tho warm-neutralized binder from 3.3 may be attributable to loss of solvent and corresponds to an increase of 0.2 scale unit on the viacometer used. It is only possible to compare the relative tendencies and not the absolute values since the binder from 3.3 has a somewhat lower solids content than the neutralized binder from 3.4 as a consequence of the lower water content. The unneutralized binder has a constant viscosity over the entire period.

A BRIEF DESCRIPTION OF THE DRAWINGS

FIG. 1 is a graph of the change in viscosity over time for the warm neutralization, versus the cold neutralization and unneutralized processes.

We claim:

1. Process for the preparation of an aqueous coating composition containing an organic binder solution including a carboxyl-containing epoxy acrylate resin having an acid number in the range from 5 to 200 mg of KOH/g, and having an epoxide equivalent weight in the range from 1000 to 40,000, and further including components selected from the group consisting of crosslinking agents, organic solvents, pigments, fillers and mixtures thereof, and the carboxyl containing epoxy acrylate resin is prepared by free radical polymerization of ethylenically unsaturated monomers, some of which contain carboxyl groups, in the presence of an epoxy resin, containing, on average, more than one epoxide group per molecule, at temperatures between 120° C. to 200° C., wherein the process for forming the coating composition comprises:

the steps of neutralizing the organic binder solution by adding a tertiary amine, heating the organic binder solution to a temperature between 60° C. and 120° C., and then dispersing the carboxyl-containing epoxy acrylate resin in water, with the proviso that at least 95% of the epoxide groups of the epoxy resin have been reacted.

2. Process according to claim 1, wherein prior to the step of dispersing the carboxyl-containing epoxy acrylate resin in water, the resin is dissolved a small amount of water.

3. Process according to claim 1, wherein the carboxyl-containing epoxy acrylate resin has an acid number ranging from 35 to 150 mg KOH/g.

4. Process according to claim 1, characterized in that the reaction mixture is kept in the temperature range from 60° C. to 120° C. for at least 15 minutes after the neutralization by means of tertiary amine.

5. Process according to claim 1, characterized in that the neutralization of the organic binder solution is carried out in the temperature range from 70° C. to 110° C.

6. Process according to any one of claims 1, 4 or 5 characterized in that the carboxyl-containing epoxy acrylate resin is prepared by reacting ethylenically unsaturated monomers, some of which contain carboxyl groups, in the temperature range from 60° C. to 200° C., using at least 2% by weight, based on the total weight of the ethylenically unsaturated monomers, of peroxide initiators in the presence of an epoxy resin containing on average more than one epoxide group per molecule.

7. Process according to claim 6, characterized in that the carboxyl-containing epoxy acrylate resin is prepared by reacting ethylenically unsaturated monomers, some of which contain carboxyl groups, in the temperature range from 120° C. to 140° C.

* * * * *